United States Patent [19]

Sirota

[11] 4,137,276
[45] Jan. 30, 1979

[54] FLEXIBLE FILM LAMINATING ADHESIVES

[75] Inventor: Julius Sirota, South Plainfield, N.J.

[73] Assignee: National Starch and Chemical Corporation, Bridgewater, N.J.

[21] Appl. No.: 825,912

[22] Filed: Aug. 19, 1977

[51] Int. Cl.$^2$ ............................................. C08L 63/00
[52] U.S. Cl. ................... 260/830 P; 428/413; 428/425; 528/59; 528/60; 528/61
[58] Field of Search ..................................... 260/830 P

[56] References Cited

U.S. PATENT DOCUMENTS

| | | | |
|---|---|---|---|
| 3,636,133 | 1/1972 | Hawkins | 260/830 P |
| 3,993,708 | 11/1976 | Brinkmann | 260/830 P |
| 4,045,510 | 8/1977 | Login | 260/830 P |

*Primary Examiner*—Paul Lieberman
*Attorney, Agent, or Firm*—Edwin Szala; Ellen T. Dec

[57] ABSTRACT

Curable two-part flexible film laminating adhesives are prepared from:
 (a) an alcoholic solution of a ketimine and/or amine terminated polyetherurethane-urea prepared by the addition of at least 50% of the stoichiometric equivalent of a diketimine having —NH functionality of 0, 1 or 3 to an isocyanate terminated polyalkylene ether diol urethane prepolymer; and
 (b) a polyepoxide in a chain-extending and crosslinking amount of about 10–30% by weight, based on the weight of said ketimine and/or amine terminated polyetherurethane-urea solids. Laminates formed using these adhesives are characterized by rapid curing, high bond strength, superior heat resistance as well as chemical and water resistance.

5 Claims, No Drawings

FLEXIBLE FILM LAMINATING ADHESIVES

BACKGROUND OF THE INVENTION

I. Field of the Invention

The present invention is directed to curable two-part laminating adhesive compositions useful in laminating flexible films and to a method for the preparation thereof. The adhesive compositions are prepared from isocyanateterminated urethane prepolymers which have been converted via diketimine intermediates and alcoholic solvents to controlled chain extended backbones containing ketimine and/or amine functional groups. The presence of a portion of the amine groups in the form of ketimine groups prevents gelation during production while providing a source of additional amine groups for subsequent reaction and curing with epoxy resins. Flexible film laminates formed using these adhesives are characterized by rapid curing, high bond strength, superior heat resistance, both chemical and water resistance. These laminates therefore find application in a wide variety of flexible packaging applications.

II. Brief Description of the Prior Art

The packaging industry, particularly the food packaging area thereof, is currently utilizing large quantities of flexible films. Since all the properties desired in such films are not available in any one film, the industry generally employs laminates prepared from a combination of films. Most often, these laminates are formed from Saran, or Saran coated substrates, Mylar, nylon film or paper laminated onto a film or sheet of a corona treated polyolefin.

In forming such laminates an adhesive is first coated onto one of the film webs. The coated web is thereafter heated to remove any solvent from the adhesive and then heat-nipped to the other film web. Since the time of exposure of the adhesive to heat either in the drying oven or heat nipping machine, is very brief, it is necessary to employ an adhesive which will cure at room temperature after the laminate has been formed. Moreover, the resulting laminate seal must develop or cure into a strong bond with no delamination occurring even when exposed to the frictional stresses and elevated temperatures encountered during formation of bags or containers therefrom, or to water or chemicals such as may occur during filling of the containers or during use and storage thereof.

Heretofore, the most satisfactory laminates as indicated by industry acceptance have been formed using urethane-based isocyanate prepolymer adhesives. Most of these urethane adhesives, however, have the disadvantage of requiring organic solvents such as methyl ethyl ketone, ethyl acetate, toluene or acetone which are unreactive with the NCO group in order to form an applicable solution. Such solvents must have extremely low moisture contents to prevent instability, they are further subject to variable humidity and environmental conditions which affect the stability, pot-life and cure properties of the adhesive system during application. Moreover, the necessity for the evaporation of huge quantities of volatile solvents from the adhesive film during curing is undesirable because of the increasing awareness of the deleterious effects of various contaminants on our environment.

In an attempt to minimize this moisture curing variable and simultaneously eliminate the dependence on expensive, unreactive, low moisture content solvents, efforts have been made to utilize the more acceptable, readily available, moisturetolerant solvents such as low alkyl alcohols together, if necessary, with much smaller amounts of acetone and methyl ethyl ketone.

In order to accomplish this end, it has been necessary to convert the terminal NCO portions of the polyurethane prepolymer chain to another functional group which is unreactive with the proposed water tolerant solvent systems. It has been found that the conversion of the NCO group to an amine group is most satisfactory for such purposes since it will react with the post-added polyepoxides used for curing so as to form satisfactory adhesives. However, the direct addition of liquid aliphatic polyamines such as diethylene triamine yields uncontrolled localized rapid reactions with the NCO groups resulting in varying degrees of gelation. Thus, U.S. Pat. No. 3,565,972 describes the use of solid aliphatic or aromatic diamines (preferably in latent form) together with a small amount of a Lewis acid-amine complex which cures on exposure to heat.

Additionally, U.S. Pat. No. 3,931,116 discloses a two-part adhesive composition wherein the amine terminated polyurethane urea polymer is formed by the addition of the isocyanate terminated urethane prepolymer into excess diamine, preferably cycloaliphatic diamines (which are possibly chosen for their steric hindrance so as to control the undesirable and excessive chain extension inherent in this step). This latter approach, however, suffers from some serious disadvantages. Since the diamine cannot be added directly to the urethane prepolymer, the process necessitates the use of two reaction vessels in the preparation of the adhesive, a costly and time-consuming disadvantage. Moreover, although the initial green strength is adequate (over 500 psi), the final cured bonds never attain the tear property required of commercial laminating adhesives due, most likely, to the inherent stearic hindrance of the initial amines and their low order of reactivity with the post-added polyepoxides.

It is therefore an object of the present invention to provide a laminating adhesive composition suitable for use in the formation of film laminates for the flexible packaging industry. It is a further object to provide such an adhesive which, when used to form a laminate, will result in one characterized by superior bond strength. It is also an object of the invention to provide an adhesive which is tolerant to moisture and which may be prepared and utilized in low cost, readily available alcoholic solutions. Finally it is an object of the invention to provide a method for the production of such adhesives at lower costs where one kettle processing techniques may be employed. These and other objects will be apparent from the description which follows.

SUMMARY OF THE INVENTION

In accordance with the present invention, a curable twopart laminating adhesive is provided which comprises:

(a) an alcoholic solution of a ketimine and/or amine terminated polyetherurethane-urea prepared by the addition of at least 50% of the stoichiometric equivalent of a diketimine having —NH functionality of 0, 1 or 3 to an isocyanate terminated polyalkylene ether diol urethane prepolymer; and (b) a polyepoxide in a chain-extending and crosslinking amount of about 10 to 30% by weight based on said ketimine and/or amine terminated polyetherurethane-urea solids.

Such laminating adhesives may be stored indefinitely as a two-part system and combined with further dilution if desired, immediately prior to use.

In forming the laminates of the present invention, conventional techniques known per se are employed to apply the adhesive solution to one of the film webs. The adhesive coated web is then ordinarily passed through an oven to remove substantially all the solvent, and then heat nipped to form a bond with the other web.

The resultant laminate is characterized by the formation of a strong bond which cures to "tear" within 24 hours after formation, the bond being heat, water and chemical resistant, and, depending upon the particular substrate films used, capable of being employed in a variety of end-use applications.

DETAILED DESCRIPTION OF THE PREFERRED EMBODIMENTS

The polyetherurethane-urea prepolymers used in the present invention are based on isocyanate terminated urethane prepolymers prepared from difunctional polyalkylene ether glycols and diisocyanates in such a ratio as to obtain an excess of isocyanate groups. These prepolymers are conventional adhesive bases, well known to those skilled in the art. The polyalkylene ether glycols are substantially linear polymers terminated at each end by hydroxyl groups and formed by the reaction between alkylene oxides and alkylene glycols to form an ether linkage between the aliphatic portions. Prepolymers of varying molecular weights and viscosities may be obtained by selecting different polyalkylene ether glycols, and/or controlling the time of polymerization of a given polyalkylene ether glycol. Examples of suitable ether glycols are poly(oxytetramethylene)-glycol, poly(oxyethylene)glycol, poly(oxypropylene)-glycol, and the like as well as those prepared from mixtures of epoxides, i.e., mixtures of two or more of ethylene oxide, propylene oxide, styrene oxide, epichlorohydrin, and the like, copolymers of the same and mixtures of any of the above. The isocyanate may be aliphatic, cycloaliphatic or aromatic such as hexamethylene diisocyanate, methylene bis(cyclohexyl isocyanate), toluene diisocyanate (either as a mixture of the 2,4- and 2,6- isomers or as 100% 2,4-toluene diisocyanate), etc.

The diketimines suitable for use in the present invention are selected from the group consisting of ethylene diamine dimethyldiketimine, ethylene diamine methylethyldiketimine diethylene triamine dimethyldiketimine, diethylene triamine methylethyldiketimine, tetraethylene pentamine dimethyldiketimine and tetraethylene pentamine methylethyldiketimine. They may be readily prepared from their respective ketones and amines by adding stoichiometric or excess amounts of the ketone to the amine. Since the reaction is exothermic, the resulting diketimine should be cooled prior to use. These diketimines may be used alone or in combination, with or without dilution in solvents such as alcohol.

In accordance with the invention, the isocyanate terminated urethane prepolymer is reacted with at least 50% of the stoichiometric equivalent of the selected diketimine, preferably with an alcoholic diluent, to form the ketimine and/or amine terminated polyetherurethane-urea. Although the order of addition is not critical, one of the advantages of the present invention is that this reaction may be carried out in one reaction vessel by adding the diketimine directly to the prepolymer. For obvious reasons, the latter technique is therefore preferred.

The dilution solvent employed may be any of the conventionally used alcohols, and most generally a $C_1$–$C_5$ monohydric alcohol such as methanol, ethanol, isopropanol, etc. Other organic solvents may of course be used but no advantage is seen therein. Additionally, up to about 15% by weight, based on the solids content, of water may be added as a diluent, either during storage or immediately before use in order to lower the cost of the adhesive and to hydrolyze a portion of the ketimine into amines.

The resultant adhesive base component may be adjusted to the desired solids-viscosity range with additional solvent, preferably alcohol. A solids range of about 60% and viscosity range of 1500 to 2500 cps is generally preferred. At this point, the adhesive base component may be stored indefinitely at ambient temperatures until ready for use.

Before use, the alcoholic solution of the ketimine and/or amine terminated polyetherurethane-urea prepolymer is treated with a chain-extending, crosslinking amount of about 10 to 30%, preferably 15 to 25%, by weight of the prepolymer solids, of a polyepoxide, such as the diglycidyl ether of p,p'-isopropyl-idene diphenol or the diglycidyl ether of the corresponding sulfone; butadiene dioxide; butanediol diglycidyl ether; 1,2,3,-tris(2,3-epoxypropoxy)propane; epoxidized vegetable oils such as soybean oil; a polyepoxide of other known phenol-formaldehyde resin; polyepoxides of polyesters, such as polyesters of adipic acid, phthalic acid and terephthalic acid; epithio ethers, wherein the epoxy oxygen is replaced with sulfur; diglycidyl aniline; diglycidyl ethers of resorcinol; triglycidyl ether of trimethylolpropane; triglycidyl ether of glycerol; triglycidyl p-aminophenol; diglycidyl ether of bisphenol-hexafluoroacetone; diglycidyl ether of tetrachlorobisphenol-A; tetraglycidoxybiphenyl; diglycidyl ether of hydrogenated bisphenol-A; and polyepoxides prepared from the reaction of a vinyl compound, such as vinyl glycidyl ether, glycidyl acrylate, glycidyl methacrylate and the like, with an olefin, such as ethylene, propylene, butadiene, etc. Mixtures of two or more of the above polyepoxides may also be employed. For purposes of the adhesive formulations of this invention, the liquid reaction products of epichlorohydrin and bisphenol-A (and its homologs) are preferred. Particularly effective relatively low molecular weight liquid epoxies of this type are Epon 815, 826 and 828. The difference between these liquid resins is primarily in the spread of the molecular weight ranges.

In addition to the critical components described above, other additives such as coloring agents, antioxidants, thickeners and the like which are conventionally used in laminating adhesives may also be added.

In order to use the adhesives of the invention, the combined components are generally diluted with additional alcohol or alcohol/water blends to provide a solids concentration of 15–40% by weight, the final concentration depending on the method of application and the desired coating weight. The adhesive may then be applied to the substrate using any conventional method including gravure roll coating, reverse roll and rod coating, etc. Most conveniently, the adhesive is applied with smooth rollers or gravure etched by cylinders such as are found in a Faustel laminating machine.

The adhesives of the present invention are useful in laminating a wide variety of films. Preferably, the adhesives are used to laminate films of Saran (a trademark for copolymers of vinylidene chloride available from E. I. duPont de Nemours), Saran coated cellophane, nylon, metal foils, glassine, Surlyn (a metallic ionomeric derivative of polyethylene available from E. I. duPont de Nemours), corona treated Mylar, corona treated polyolefin or paper to similar surfaces, preferably to corona treated polyolefins, particularly polyethylene and polypropylene substrates.

The following examples, in which the parts are by weight and temperatures are in degrees Celsius, unless otherwise specified, are illustrative of the present invention.

In the Examples below, the following test procedures were used to evaluate the adhesive of the present invention.

Peal Adhesion (strength test):

A Suter Testing Unit was run at a rate of 12 inches per minute to pull apart a 1 inch wide strip of the laminate, and the force needed is shown in grams. Preferably, the adhesive should cure to "tear", i.e. the base film should rupture instead of the film separating. Tests were done initially (for green strength), overnight and after one week storage.

Static Load Test (using 1 week old laminates):

A one inch wide strip of the laminate is prepared in which no adhesive is applied to approximately the upper ½ inch. One substrate film is then attached vertically to a heavy cardboard card and a 35 gm. weight (including clip) is attached to the other film substrate. The assembly is mounted in an oven at 82° C. for 15 minutes and then removed. The delamination (slippage or creep) caused by the weight is measured in inches. A fully cured, heat resistant bond will show no (0") delamination.

Boiling Water Test (using 1 week old laminates):

A 2" × 3" swatch of lamination is placed in boiling water and removed after 15 minutes. A tunnel or blister would indicate failure of the adhesive due to water sensitivity or thermoplasticity.

EXAMPLE I

60 Gms of poly(1,2-oxypropylene)glycol having a hydroxyl number of 110 and mol. wt. of 1000 was allowed to react at 54° C. for 2 hours with 14 gms toluene diisocyanate (mixture of 80% 2,4-toluene diisocyanate and 20% 2,6-toluene diisocyanate) and 0.02 gms dibutyltin dilaurate as catalyst. This prepolymer had 2.3% free NCO or 0.041 mols of NCO. Then 8 grams of 50% diethylene triamine dimethyldiketimine in excess aceton (0.022 mols—NH), further diluted with 23 gms ethanol (0.50 mols) was added and mixed for 1 hour. In terms of equivalents, the diketimine was theoretically 54% of the available NCO (i.e. 0.022 mols NCO) with the remainder of the NCO (0.019 mols) capped vis reaction with the alcohol. Thereafter, 3 gms of water was added and the final product adjusted to a total solids content of 70% with alcohol.

To 110 gms of this solution (containing 0.088 mols amine hydrogen still available from the diketimine) was added 17 gms of an epoxide resin of the p,p'-isopropylidenediphenolepichlorohydrin type (Epon 828) having an epoxide equivalent of 190. This represented 22 parts Epon resin on 100 parts polymer solids and 102% of the available amine hydrogens. This mix was then diluted to 25% solids with isopropanol and 1½ lbs per ream coatings applied and dried on ½ mil 50M nylon film. This was then immediately laminated to 2½ mil low density polyethylene (LDPE). Peel test values on 1" × 3" strips were as follows: immediate green strength = 620 psi, overnite values = 1600 psi with tear at glue line, 1 week values = 1800 psi with tear at glue line. Static Load test gave 0 delamination and Boiling Water test showed no failure.

EXAMPLE II

A prepolymer was prepared according to procedure of Example I using the same amounts and reagents employed therein. Then a mix of 5.53 gms tetraethylene pentamine dimethyl diketimine and 1.82 gms ethylenediamine dimethyldiketimine in 3.32 gms excess acetone (0.0615 mols —NH), further diluted with 24.72 gms ethanol was added and mixed for 1 hour. In terms of equivalents, the diketimines represented theoretically 150% of the available NCO, i.e. a 50% excess and therefore no capping with alcohol occurred in this example. Then 3 grams of water were added with additional ethanol to dilute product to 60% solids and a viscosity of 2000 cps.

To 112.41 gms of this solution (containing 0.134 mols amine hydrogen available from the diketimines) was added 20 gms of a p,p'-isopropylenediphenol-epichlorohydrin type (Epon 828) having an epoxide equivalent of 190. This represented 25.5 parts Epon resin on 100 parts polymer solids and 100% of the available amine hydrogens. This mix was then diluted to 25% solids with isopropanol and 1½ lbs. per ream coating applied and dried on ½ mil 50M Mylar film. This was then immediately laminated to 2½ mil LDPE. Peel test values on 1" × 3" strips were as follows: green strength = 650 psi; overnite values = 2100 psi with tear at glue line; 1 week values = 2000 psi with tear at glue line. Static Load test gave 0 delamination and Boiling Water test showed no failures.

EXAMPLE III

The procedure of Example I was repeated using 9.2 gms of 50% diethylene triamine methylethyldiketimine in excess methyl ethyl ketone in place of the diethylene triaminedimethyl diketimine in acetone. Tests results on a laminate prepared as in Example I using the adhesive gave Peel values of 500 psi immediate green strength, 1500 psi overnite with tear at glue line and 1600 psi after one week with tear at glue line. Static Load test gave 0 delamination and Boiling Water test showed no failures.

EXAMPLE IV

The procedure of Example II was repeated using 6.11 gms tetraethylene pentamine methylethyldiketimine in place of tetraethylene pentamine diemthyldiketimine and 2.18 gms ethylene diamine methylethyldiketimine in place of the ethylene diamine dimethyldiketimine. The diketimines were mixed with 3.83 gms methyl ethyl ketone and further diluted with 24.72 gms ethanol. Tests results of laminates formed therewith gave Peel Strength values of 550 psi green, 1400 psi overnite with tear at glue line and 1500 psi after one week with tear at glue line. Static Load test gave 0 delamination and Boiling Water test showed no failures.

EXAMPLES V–VII

Using the procedures disclosed in Example I laminating adhesives can readily be prepared:

V. by replacing the poly(1,2-oxypropylene)glycol with 60 parts poly(oxytetramethylene)glycol (OH # of 110);

VI. by replacing the epoxide resin with 18.45 gms of diglycidyl ether of p,p-isopropylidenediphenol (epoxide equivalent of 175); and VII. by replacing the glycol with 60 parts poly(1,2-oxypropylene)glycol (OH # of 56), and replacing the diisocyanate blend with 8.2 parts of 2,4-toluene diisocyanate.

In all cases, laminates prepared using such adhesives will exhibit superior properties comparable to those displayed by the adhesive of Example I-IV.

EXAMPLE VIII

This example illustrates the superior properties achieved in laminations using the compositions of the present invention in contrast to compositions prepared in accordance with U.S. Pat. No. 3,931,116 (wherein the polyetherurethane-urea prepolymer is prepared using a diamine). Thus, a laminate was prepared as in Example I using an isopropanol solution of Witcobond 203 (a urethane adhesive available from Witco Chemical and prepared in accordance with U.S. Pat. No. 3,931,116) and Witcobond WC (a polyepoxide adhesive promoter). Initial Green Strength Peel Test results were 780 gms. overnight of 800-900 and 1 week of 1000-1050 gms with no tear occurring.

The comparative results shown in this example clearly illustrate the superiority of the compositions of the present invention wherein tear at glue line was observed, even after overnight aging, in all laminates prepared.

The preferred embodiments of the present invention having been described above, various modifications and improvements thereon wll now become readily apparent to those skilled in the art. Accordingly, the spirit and scope of the present invention is defined not by the foregoing disclosure, but only by the appended claims.

I claim:

1. A curable two-part laminating adhesive for flexible film comprising:
   (a) an alcoholic solution of ketimine terminated and/or amine terminated polyetherurethane-urea prepared by the addition of at least 50% of the stoichiometric equivalent of a diketimine having —NH functionality of 0, 1 or 3 to an isocyanate terminated polyalkylene ether diol urethane prepolymer; and
   (b) a polyepoxide in a chain-extending and cross-linking amount of about 10-30% by weight, based on the weight of said ketimine terminated and/or amine terminated polyetherurethane-urea solids.

2. The laminating adhesive of claim 1 wherein the prepolymer of part (a) is prepared by the reaction of a di-functional polyalkylene ether glycol selected from the group consisting of poly(oxytetramethylene)glycol, poly(oxyethylene) glycol, and poly(oxypropylene)-glycol with a diisocyanate selected from the group consisting of hexamethylene diisocyanate, methylene bis(cyclohexyl isocyanate) and toluene diisocyanate.

3. The laminating adhesive of claim 1 wherein the diketimine used in part (a) is selected from the group consisting of ethylene diamine dimethyldiketimine, ethylene diamine methyl-ethyldiketimine, diethylene triamine dimethyldiketimine, di-ethylene triamine methylethyldiketimine, tetraethylene pentamine dimethyldiketimine and tetraethylene pentamine methylethyldiketimine.

4. The laminating adhesive of claim 1 wherein the polyepoxide of part (b) is a reaction product of epichlorohydrin and bisphenol-A.

5. The laminating adhesive of claim 1 wherein the polyepoxide is present in an amount of 15 to 25% by weight, based on the weight of the ketimine and/or amine-terminated polyetherurethane-urea solids.

* * * * *